United States Patent [19]

Dolgin

[11] Patent Number: 5,203,435
[45] Date of Patent: Apr. 20, 1993

[54] COMPOSITE PASSIVE DAMPING STRUTS FOR LARGE PRECISION STRUCTURES

[75] Inventor: Benjamin P. Dolgin, Northridge, Calif.

[73] Assignee: The United States of America as represented by the Administrator of the National Aeronautics and Space Administration, Washington, D.C.

[21] Appl. No.: 575,697

[22] Filed: Aug. 31, 1990

[51] Int. Cl.$^5$ .............................................. F16F 1/14
[52] U.S. Cl. ................................. 188/322.5; 267/154; 267/141.2
[58] Field of Search ....................... 188/322.5; 248/608, 248/609; 267/154, 273, 276, 281, 141.1, 144.2; 403/225, 228; 244/158 R, 159; 52/727

[56] References Cited

U.S. PATENT DOCUMENTS

| | | | |
|---|---|---|---|
| 3,079,277 | 2/1963 | Painter et al. | 428/114 |
| 3,276,762 | 10/1966 | Thomas | 267/154 |
| 3,574,104 | 4/1971 | Medler | 52/727 X |
| 3,892,398 | 7/1975 | Marsh | 267/153 |
| 4,254,847 | 3/1981 | Kamman et al. | 188/322.5 X |
| 4,278,726 | 7/1981 | Wieme | 428/229 |
| 4,312,162 | 1/1982 | Medney | 52/727 X |
| 4,406,558 | 9/1983 | Kochendorfer et al. | 403/228 X |
| 4,411,114 | 10/1983 | Wurtinger et al. | 52/727 X |
| 4,457,500 | 7/1984 | Drachenberg et al. | 267/148 |

FOREIGN PATENT DOCUMENTS

| | | | |
|---|---|---|---|
| 211549 | 9/1986 | Japan | 188/322.5 |
| 124335 | 6/1987 | Japan | 188/322.5 |
| 545797 | 5/1977 | U.S.S.R. | 267/154 |

OTHER PUBLICATIONS

*Viscous Damped Space Structure for Reduced Jitter*, (Wilson and Davis), Pre Oct. 5, 1989.
*Damping 1986 Proceedings*, (Hedgepeth et al), Feb. 1986, pp. DB1-DB30.
Passive Damping for Space Truss Structures / Chen & Wada, Apr. 1988.
Very High Damping in Large Space Structures / Wilson & Davis, Pre Aug. 31, 1990.
Three Loop Balanced Bridge Feedback Pointing Control / Lurie, Pre Aug. 31, 1990.
Composite Damping Struts w/ Viscoelastic Plies / Dolgin & Chen, Presented Oct. 5, 1989.

Primary Examiner—Robert J. Oberleitner
Assistant Examiner—Alfred Muratori
Attorney, Agent, or Firm—John H. Kusmiss; Thomas H. Jones; Guy M. Miller

[57] ABSTRACT

In the field of viscoelastic dampers, a new strut design comprises a viscoelastic material sandwiched between multiple layers, some of which layers bear and dampen load force. In one embodiment, the layers are composite plies of opposing orientation. In another embodiment, the strut utilizes a viscoelastic layer sandwiched between V-shaped composite plies. In a third embodiment, a viscoelastic layer is sandwiched between sine-shaped plies. Strut strength is equal to or greater than conventional aluminum struts due to the unique high interlaminar shear ply design.

11 Claims, 4 Drawing Sheets

$$\left\{ \begin{array}{l} \text{TENSION} \\ \dfrac{d\sigma_1}{dx} = \dfrac{\tau_3}{t_1} \\ \dfrac{d\sigma_2}{dx} = -\dfrac{\tau_3}{t_2} \\ \sigma_1 = E_1 \varepsilon_1 \\ \sigma_2 = E_2 \varepsilon_2 \\ \tau_3 = G_3 \delta_3 \\ \varepsilon_1 = \dfrac{du_1}{dx} \\ \varepsilon_2 = \dfrac{du_2}{dx} \\ \delta_3 = \dfrac{u_1 - u_2}{t_3} \\ u_1(0) = 0 \\ u_2(0) = 0 \\ \sigma(L) = \sigma_0 \\ \sigma_2(L) = 0 \end{array} \right.
\qquad
\left\{ \begin{array}{l} \text{TWIST} \\ \sigma_1 = \sigma_2 \, ; \, \tau_1 = -\tau_2 \, ; \, \varepsilon_1 = \varepsilon_2 \, ; \, \upsilon_1 = -\upsilon_2 \\ \dfrac{d\tau_1}{dx} = \dfrac{\tau_3}{t_1} \\ \sigma_1 = C_{11}\varepsilon_1 + C_{16}\delta_1 \\ \tau_1 = C_{16}\varepsilon_1 + C_{66}\delta_1 \\ \tau_3 = G_3 \delta_3 \\ \varepsilon_1 = \dfrac{du_1}{dx} \\ \delta_1 = \dfrac{d\upsilon}{dx} \\ \delta_3 = \dfrac{2\upsilon_1}{t_3} \\ u_1(0) = 0 \\ \upsilon_1(0) = 0 \\ \tau_1(L) = 0 \\ \sigma_1 = \sigma_0 = \text{invar}(x) \end{array} \right.$$

——————SOLUTION:——————

$$\delta_3 = \dfrac{\sigma_0}{E_1} \cdot \dfrac{L}{t_3} \cdot \dfrac{\sinh \beta \bar{x}}{\beta \cosh \beta} \qquad \delta_3 = 2 \cdot \dfrac{\sigma_0}{C_{11}\dfrac{C_{66}}{C_{16}} - C_{16}} \cdot \dfrac{L}{t_3} \cdot \dfrac{\sinh \beta \bar{x}}{\beta \cosh \beta}$$

$$\beta = L \cdot \sqrt{\dfrac{G}{t_3}} \sqrt{\dfrac{1}{E_1 t_1} - \dfrac{1}{E_3 t_2}} \qquad \beta = L \cdot \sqrt{\dfrac{G_3}{t_3}} \cdot \sqrt{\dfrac{2}{t_1} \cdot \dfrac{C_{11}}{C_{11} C_{66} - C_{16}^2}}$$

FIG. 5

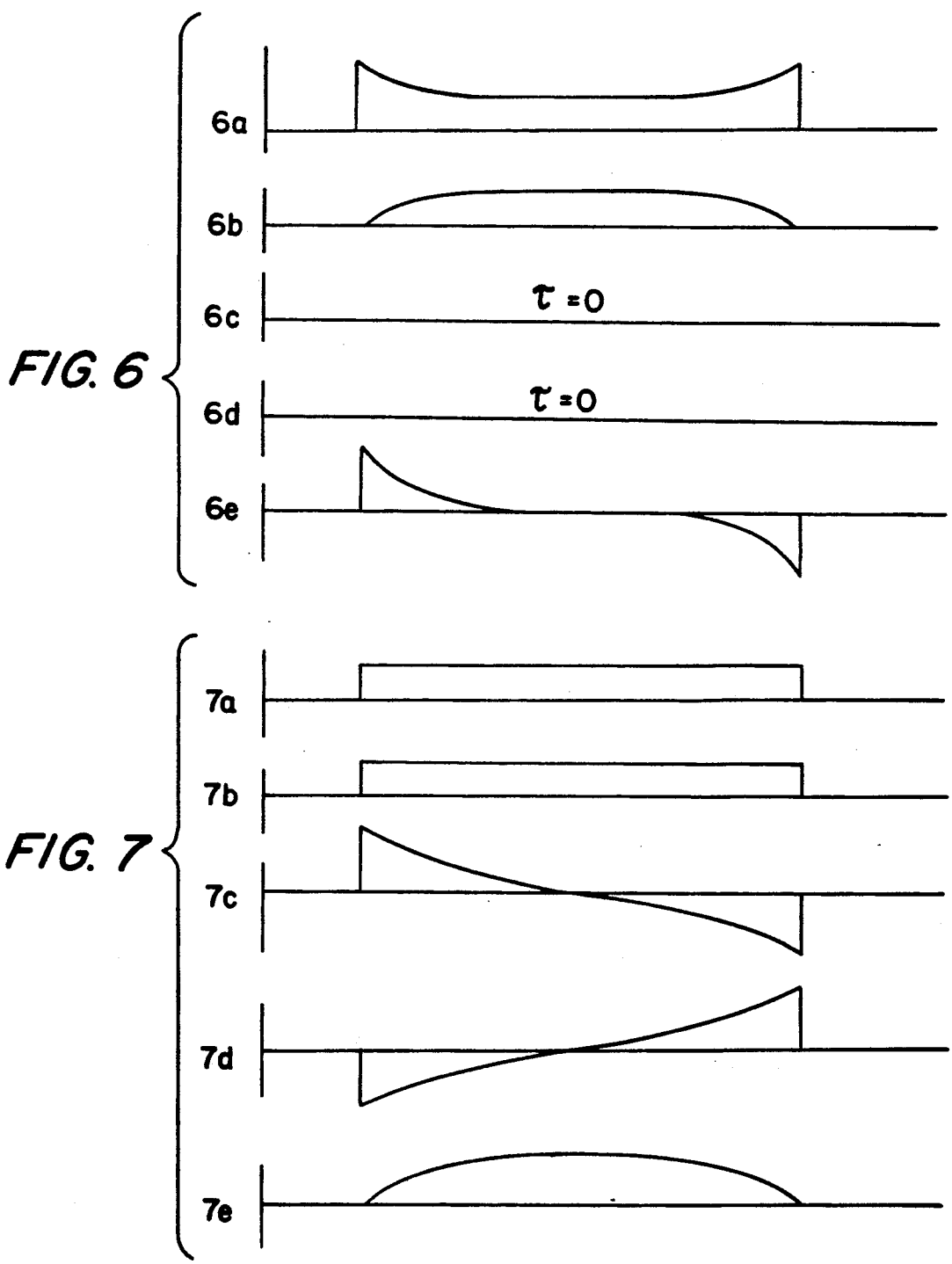

COMPOSITE PASSIVE DAMPING STRUTS FOR LARGE PRECISION STRUCTURES

ORIGIN OF THE INVENTION

The invention described herein was made in the performance of work under a NASA contract, and is subject to the provisions of Public Law 96-517 (35 U.S.C. Section 202) in which the Contractor has elected not to retain title.

TECHNICAL FIELD

This invention relates to passive damping of large structures and, more particularly to a passive, viscoelastic, precision damping strut.

BACKGROUND OF THE INVENTION

One of the technological limitations of space exploration results from a spacecraft's inability to aim devices with extremely high accuracy. Current requirements for the aiming accuracy of 20 to 40-foot-long truss structures are approximately 20 nanoradian. Since the spacecraft has a number of vibration sources with undetermined frequencies (solar pressure, micrometeorites, reaction wheels, etc.), the truss structures must have some vibration damping devices. Conventional damping designs of structures of great length have proven ineffective at inhibiting vibrations at low frequencies, down to 10 Hz. These types of vibrations are very apparent in a space environment, and extremely damaging for control mechanisms.

Active aiming mechanisms can, and do, compensate for some of the vibration perturbations which a spacecraft experiences. Boris Lurie, "Balanced Bridge Feedback Pointing Control," Proc. of ACC, Atlanta, 1988, is an example of such an active feedback control system. However, for control systems to be robust, the vibration and resonances at low frequencies down to 10 Hz must be suppressed.

Conventionally, there have been a number of ways to incorporate damping into strut design. Examples of these techniques are shown in Gun-Shing Chen and Ben K. Wada, "Passive Damping for Space Truss Structures," Apr. 1988, and James F. Wilson and L. Porter Davis, "Viscous Damped Space Structures for Reduced Jitter," 58th Shock and Vibration Symposium.

These conventional designs place a viscoelastic or viscous damper in parallel with a load-carrying aluminum cylinder. These designs, however, experience several difficulties. They tend to add weight to a space structure, which excessive weight increases liftoff cost and ability. The designs are unproven at low vibration frequencies and low displacements. Finally, the level of absorption decreases with increased strut lengths, which can be a significant factor in designing large scale space structures.

SUMMARY OF THE INVENTION

It is therefore an object of the invention to provide a viscoelastic damping strut which utilizes a composite material.

It is a further object of the invention to provide a lightweight composite damping strut which effectively inhibits vibrations at frequency ranges down to 10 Hz.

It is yet another object of the invention to provide passive vibration damping of vibrations in struts where the level of absorption does not effectively decrease as strut length increases.

These and other objects are achieved according to the invention by a strut having a viscoelastic material sandwiched between layers wherein one layer is a specially designed laminate which will bear and dampen some of the stress when a load is applied.

In one embodiment, the sandwiching layers include one or several composite plies. The composite plies are disposed on each side of the viscoelastic layer or film. The plies have respectively opposing orientations. Each layered ply on one side of the viscoelastic film has an opposing orientation to the respective ply on the other side of the viscoelastic film.

In further embodiments of the invention, the viscoelastic layer is sandwiched between opposing V-shaped or sine-shaped composite plies. A V-shaped ply is a ply where the fibers are laid at one angle along one-half of the length of the strut and at a different, opposite, orientation along the remainder of the strut length. A sine-shaped ply has an orientation where the fibers run back and forth along the entire length of the ply; in essence, several V-shaped plies connected end to end. These configurations create stress in the viscoelastic layer using a "tension-twist" coupling mechanism.

In the shown embodiments of the invention, at least one ply in the laminate strut acts as a damper. The composite ply is designed with high interlaminar shear. Although high shear is a severe limitation for high load structural applications, the same shear can be used to incorporate damping into a laminate strut.

BRIEF DESCRIPTION OF THE DRAWINGS

FIG. 5 is a listing of the formulae illustrating the advantages of the invention;

FIG. 6a is a graph showing axial strain in the tubular member of a conventional design;

FIG. 6b is a graph showing axial strain in the constraining member of a conventional design;

FIG. 6c is a graph showing that shear strains in both members of a conventional design are zero;

FIG. 6d is a graph showing that shear strains in both members of a conventional design are zero;

FIG. 6e is a graph showing the shear strain in the viscoelastic layer of a conventional design;

FIG. 7a is a graph showing the axial strain in the inner V-shaped ply of the shown embodiment;

FIG. 7b is a graph showing axial strain in the outer V-shaped ply of the shown embodiment;

FIG. 7c is a graph showing the shear strain in the inner V-shaped ply of the shown embodiment;

FIG. 7d is a graph showing the shear strain in the outer V-shaped ply of the shown embodiment; and FIG. 7e is a graph showing the shear strain in the viscoelastic layer of the shown embodiment;

DETAILED DESCRIPTION OF THE PREFERRED EMBODIMENTS

Figure 1:
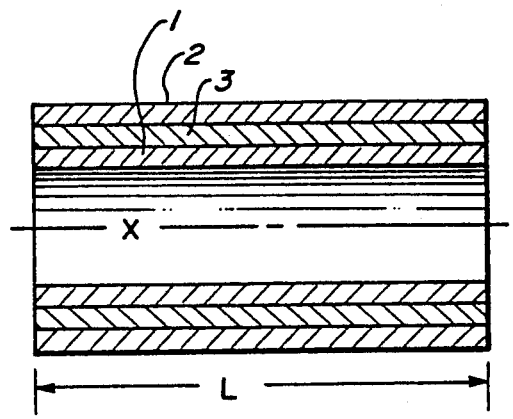
FIG. 1 is a cross-sectional illustration of a conventional damping system.

As shown in FIG. 1, conventional damping design is based on the fact that under load, a tubular member 1 is caused to expand. The constraining member 2, which is not in the direct load path, has a much smaller expansion. The difference in expansion between the tubular member 1, and the constraining member 2, causes shear stresses in the viscoelastic member 3 separating them.

Chen and Wada (C&W), discussed above, have shown that these shear stresses are concentrated near the ends of the constraining member. C&W carried their analysis further to include the case when a constraining member is an asymmetric laminate. Extension of the tubular member, in this case, causes the extension and the twist of the constraining member. C&W have shown that for a given thickness of the constraining member the increase in damping due to twist does not compensate for the decrease in damping due to the loss in the longitudinal stiffness of the constraining member.

In the shown embodiments of the invention, at least one ply in the laminate strut acts as a damper. The composite ply is designed with high interlaminar shear. Although high shear is a severe limitation for high load structural applications, the same shear can be used to incorporate damping into a laminate strut.

Every composite strut has several plies with different fiber orientation. In the shown embodiments of the invention, the space between these plies or the plies themselves are filled with a viscoelastic material, and high levels of shock absorption may be seen.

Figure 2:
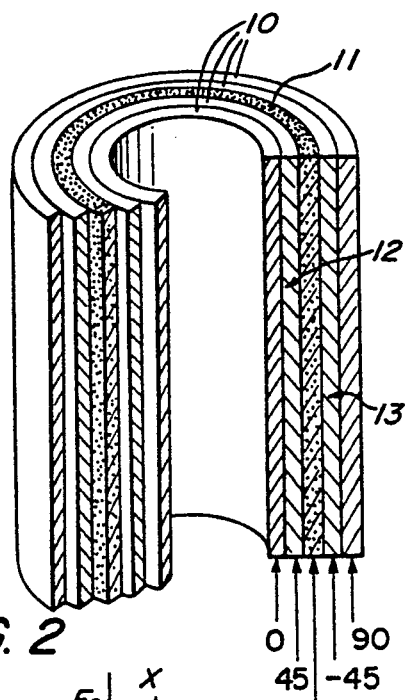
FIG. 2 is a cross-sectional illustration of an embodiment of the invention.

Such an embodiment is illustrated in FIG. 2. Therein two plies 10 are on each side of a viscoelastic layer or film 11. The viscoelastic layer 11 may be designed with or without fiber reinforcement.

The plies 10 which are disposed on each side of the viscoelastic layer 11 have orientations which are opposing. For instance, plies 12 and 13 have fiber orientations of +45 degrees and −45 degrees, respectively. Furthermore, in the embodiment shown in FIG. 2, plies 14 and 15 have fiber orientations of 0 degrees and 90 degrees, respectively.

The use of viscoelastic damping material to reduce structure vibration has been known for quite some time. See, e.g., U.S. Pat. No. 3,079,277, to Painter et al., issued Feb. 26, 1963. Additionally, the sandwiching of viscoelastic layers between nonelastomeric layers to obtain a vibration damping laminate structure is also known. See, e.g., Wieme, U.S. Pat. No. 4,278,726. Finally, it is also known to layer fiber reinforced, elastomeric layers having opposing orientations. See, e.g., U.S. Pat. No. 3,892,398. With the exception of U.S. Pat. No. 3,892,398, each of these systems utilizes a tension-tension coupling of layers in order to provide vibration damping. U.S. Pat. No. 3,892,398 uses a radial damping of a spring to obtain absorption.

The shown embodiment, on the other hand, utilizes a viscoelastic layer 11 sandwiched between composite plies 10 having opposing orientations. By utilizing such a design, the shear force from a load stresses the viscoelastic layer to impose a "tension-twist" coupling and thereby obtain vibration damping. This type of coupling increases the damping level by having the plies themselves react to a load force, and apply additional damping force in a second direction; a "twist" direction.

The design is based on the theory that composite materials such as laminates produce large interlaminar stress fields. The viscoelastic material 11 located between the plies 10 acts as a shock absorber. By specially designing the composite ply orientations, one is able to have interlaminar shear so that the plies themselves will bear some of the load. Thus, if the viscoelastic layer evaporates, the strut will still carry the load.

Damping can be further enhanced by the introduction of V-shaped or sine-shaped laminate plies. Such an embodiment is illustrated in FIG. 3.

A V-shaped ply is a ply in which the composite is oriented at one angle $A_1$ (e.g., +15 degrees) along the first half 21 of the length of the strut and at a different angle $A_2$ (e.g., −15 degrees) along the remainder 22 of the strut length. A V-shaped ply is a rough equivalent of two unidirectional plies connected end to end. A sine-shaped ply is an equivalent of several V-shaped plies connected end to end.

Figure 3:
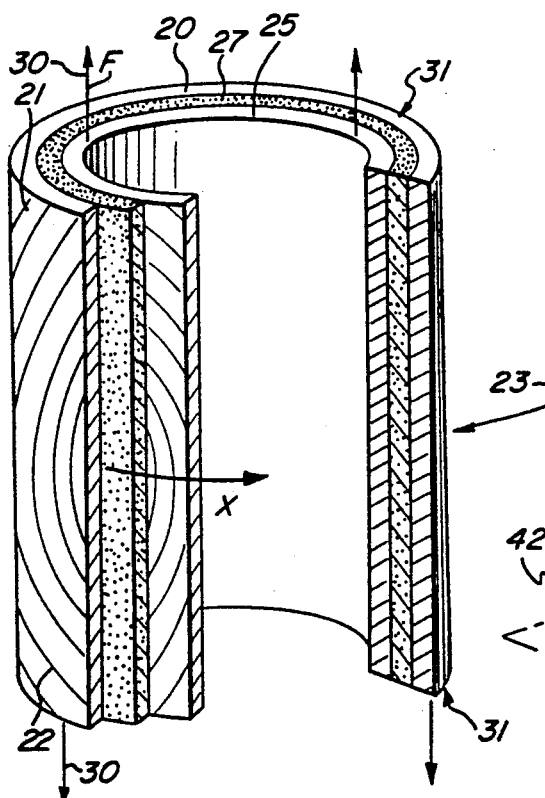
FIG. 3 is a cross-sectional illustration of a second embodiment of the invention.

As seen in FIG. 3, if one applies a tension force 30 to the ends of the V-shaped ply 31, the central cross-section 23 of the outside of the strut will turn in the direction X indicated.

Lamination theory predicts that the magnitude of this movement grows with the length of the strut. If the outer V-shaped strut 20 is located next to another V-shaped strut 25 with an opposite orientation (as in FIG. 3), then the relative movement of the central cross-sections will double. Each respective cross-section will move in an equal and opposite direction, allowing the aggregate respective movements to be twice as large. A viscoelastic material 27 placed in between the V-shaped plies can, therefore, act as a damper for the axial shocks.

Two V-shaped plies separated by a viscoelastic layer is an ideal shock absorber. In the proposed design for a strut of a given stiffness, the amount of the strain energy transferred into the viscoelastic layer actually grows with the increase in the strut length. In this design, the more energy that goes into the viscoelastic layer, the higher the shock absorption.

Figure 4:
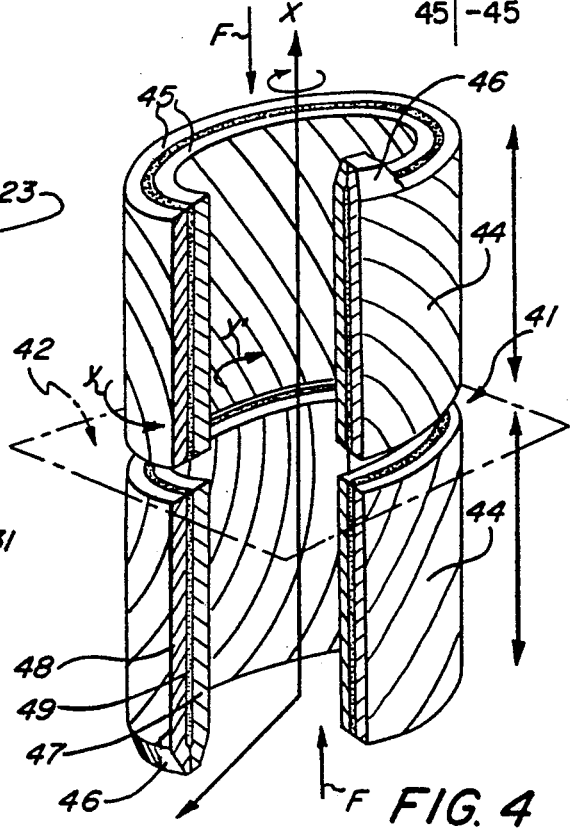
FIG. 4 is an illustration of a model of a preferred embodiment of the invention.
Figure 8:
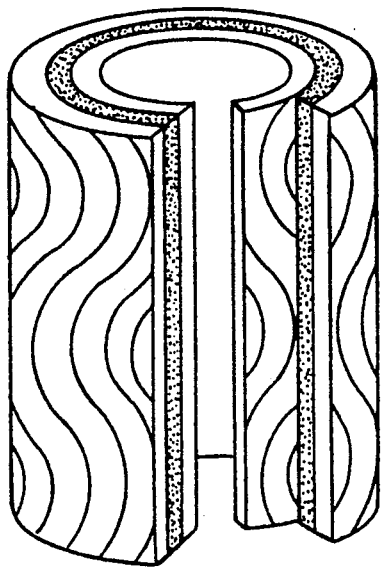
FIG. 8 is a graphical illustration showing both tubular members with sine-shaped plies.
Figure 9:
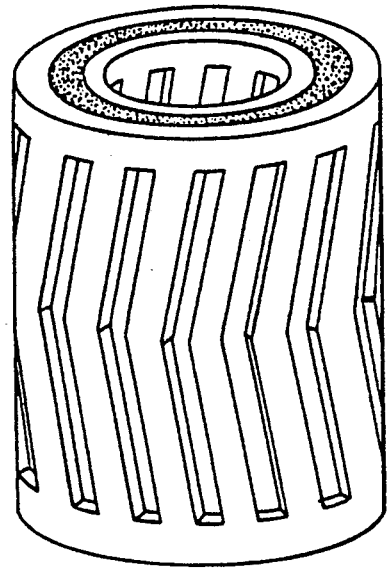
FIG. 9 is a graphical illustration showing the chevron shape of the grooves discussed in a preferred embodiment of the invention.
Figure 10:
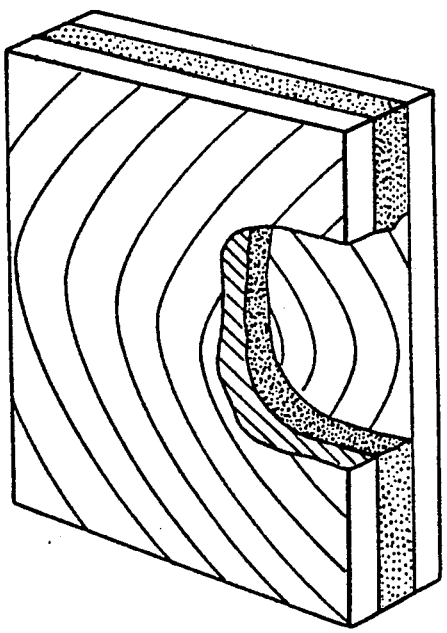
FIG. 10 is a graphical illustration showing the preferred embodiment of the invention being configured in flat layers.

A model of a V-shaped ply is shown in FIG. 4. In this model, each half 44 of the inner and outer V-shaped plies 45 is represented by a unidirectional ply. The ends 46 of the inner and outer plies 45 are connected to each other.

The point 41 where the halves 44 of the V-shaped plies 45 meet has a symmetry reflected from the cross-sectional plane 42. The symmetry reflects the orientation of the halves 44 of the V-shaped plies 45, each half 44 being a mirror image of the other.

When a force F is applied, the plies 45 rotate with a maximum rotation at the middle 41. Inner ply 47 rotates in the Y' direction, and outer ply 45 rotates in the Y direction, while the viscoelastic layer 49 bears additional shear forces.

It should be noted, for modelling purposes, that asymmetric laminates and laminates with V-shaped plies behave similarly. In addition, a properly designed asymmetric laminate tubular member produces the same deformation in the axial direction as a solid aluminum strut. The asymmetric member also produces twist deformations.

The model illustrated in FIG. 4 is described by formulae contained in FIG. 5. Proper selection of the angle of the V-shaped ply can yield a total damping factor nearly double that theoretically achievable in the conventional design. Theory predicts a damping factor in excess of 40% for currently-available materials.

In FIG. 6, the shear strain distribution is plotted for the several layers of the conventional designs, and in FIG. 7, for the shown embodiments of the invention.

FIG. 6a shows the axial strain in a tubular member of a conventional strut FIG. 6b shows the axial strain in the constraining member of a conventional strut. As shown in FIGS. 6c and 6d, shear strain on load-carrying members is zero. FIG. 6e shows the shear strain in the viscoelastic layer of a conventional strut, which shear strain is due to the axial strain mismatch between the tubular and constraining members.

FIG. 7 illustrates the strain distribution where a viscoelastic layer is sandwiched between two V-shaped plies. FIGS. 7a and 7b shows the axial strain in the V-shaped plies. FIGS. 7c and 7d show the shear strain in the V-shaped plies. FIG. 7e shows the shear in the viscoelastic layer due to the opposing V-shaped plies.

In all of these graphs the vertical scale is constant. One will note the increase in the shear strain imposed on the viscoelastic layer by using either one or several V-shaped plies. This increase in shear-strain results in an increase in damping ability of the strut.

Presently, the preferred embodiments of the invention utilize graphite or carbon fiber reinforced, polyamide based composite plies. A polyamide composite strut is stronger than a conventional aluminum strut with the same weight and stiffness. An increase in the constraining layer thickness for a conventional design (up to 10 times thicker than the load bearing layer) can bring absorption factors on the level of 40%, however, strut weight is increased by at least a factor of 10. A composite damping strut with 30% absorption, and the strength of aluminum, will weigh one-fourth that of an aluminum strut.

The production of V-shaped plies is relatively easy. V-shaped prepregs are unintentionally produced during impregnation of the woven fabrics. If the pulleys of the Impregnation Tower are not aligned appropriately, the pull in the center is too large, and the weave is distorted. The fill fibers are aligned precisely in the way required to lay up a V-shaped ply. Unidirectional prepregs can be brought in the same V-shaped state through the stretching of a slightly heated prepreg. Hot melt filament winders are capable of producing V-shaped plies without any modifications. If the epoxy (matrix) is tacky enough, any filament winder can produce a V-shaped ply.

Additionally, the use of a V-shaped ply design is not limited to carbon fiber reinforced composite materials. For example, steel belt reinforced rubber shock absorbers can utilize the same design. These shock absorbers may be used as supports for heavy machinery, bumpers of cars, and vibration isolation mounts. The strength and the stiffness of these mounts and supports can be increased if the V-shaped ply design is used.

The concept of a V-shaped ply can be used in parts made from metals or plastics. For example, a metallic cylinder with V-shaped cuts behaves in exactly the same manner as a fiber reinforced V-shaped ply. In such an embodiment, one creates metallic "V-shaped" plies by machining chevron-shaped grooves in a thin walled metallic cylinder. Therefore, viscoelastic damping can be introduced in exactly the same manner as in the fiber reinforced composites.

Furthermore, the invention should not be thought to be limited to tubular structures, which are merely shown as the preferred embodiment of the invention. For instance, the sandwiched composite layers can be applied in a flat shaped strut.

Those skilled in the art will appreciate that various adaptations and modifications of the just-described embodiments can be configured without departing from the scope and spirit of the invention. Therefore, it is to be understood that, within the scope of the appended claims, the invention may be practiced other than as specifically described herein.

I claim:

1. An energy absorbing strut, comprising at least two tubular members disposed one inside the other, said tubular members being separated by a viscoelastic material for bearing stress when a load force is applied to the strut, at least two of said tubular members being reactively designed such that some of said load force applied to the strut ma be dampened by a combined action of the reactive tubular members, wherein the tubular members surrounding the viscoelastic material experience interlaminar shear when the load force is applied, all of said tubular members being laminate reactive tubular members having a composite ply, and the composite ply of each of said laminate tubular members surrounding said viscoelastic material having an opposing orientation to the composite ply of the tubular member inside said viscoelastic material.

2. An energy absorbing strut, comprising two composite ply tubular members disposed one inside the other, said composite ply tubular members being separated by a viscoelastic material for bearing stress when a load force is applied to the strut, said composite ply tubular members being reactively designed such that some of said load force applied to the strut may be dampened by a combined action of the reactive composite ply tubular members, and wherein each reactive composite ply tubular member surrounding the viscoelastic material has a ply orientation, the orientation of one opposing the orientation of the other such that the viscoelastic material between the composite ply tubular members experiences a change in interlaminar shear when the load force is applied and at least one of said reactive composite ply tubular members is a V-shaped ply.

3. An energy absorbing strut, comprising two composite ply tubular members disposed one inside the other, said tubular members being separated by a viscoelastic material for bearing stress when a load force is applied to the strut, said composite ply tubular members being reactively designed such that some of said load force applied to the strut may be dampened by a combined action of the reactive composite ply tubular members, and wherein each reactive composite ply tubular member surrounding the viscoelastic material has a ply orientation, the orientation of one opposing the orientation of the other such that the viscoelastic material between the composite ply tubular members experiences a change in interlaminar shear when the load force is applied and at least one of said reactive tubular members is a sine-shaped ply.

4. An energy absorbing strut, comprising two composite ply tubular members disposed one inside the other, said composite ply tubular members being separated by a viscoelastic material for bearing stress when a load force is applied to the strut, said tubular members being reactively designed such that some of said load force applied to the strut may be dampened by a combined action of the reactive composite ply tubular members, and wherein each reactive composite ply tubular member surrounding the viscoelastic material has a ply orientation, the orientation of one opposing the orientation of the other such that the viscoelastic material between the composite ply tubular members experiences a change in interlaminar shear when the load force is applied and at least one of said reactive tubular members is a metallic cylinder having chevron-shaped grooves.

5. An energy absorbing apparatus, comprising:
   (a) a first layer including a composite ply having a first orientation;
   (b) a second layer including a composite ply having a second orientation opposing said first orientation such that said first and second layers experience interlaminar shear when a load is applied to the apparatus; and
   (c) a viscoelastic layer disposed between said first and second layers such that stress is borne by said viscoelastic layer when a load is applied to the apparatus.

6. The apparatus of claim 5, wherein at least one of the first and second composite plies are V-shaped plies.

7. The apparatus of claim 5, wherein the first and second composite plies are sine-shaped plies.

8. The apparatus of claim 5, wherein stress is encountered by the viscoelastic layer via a "tension-twist" coupling with the load through the first and second layers.

9. The apparatus of claim 5, wherein the first and second layers each include several composite plies, each composite ply in the first layer having an opposing orientation to a respective composite ply in the second layer.

10. The apparatus of claim 5, wherein at least one of said first and second layers are tubular and said first layer is disposed inside said second layer.

11. The apparatus of claim 5, wherein said layers maintain a flat shape.

* * * * *